United States Patent
Siegmund et al.

(10) Patent No.: US 6,255,966 B1
(45) Date of Patent: *Jul. 3, 2001

(54) METHOD OF REMOTELY PROGRAMMING A CELLPHONE VIA A NETWORK

(75) Inventors: Gerd Siegmund, Stuttgart; Heike Felbecker-Janho, Korntal-Münchingen, both of (DE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/989,438

(22) Filed: Dec. 12, 1997

(30) Foreign Application Priority Data

Dec. 13, 1996 (DE) .............................. 196 51 833

(51) Int. Cl.$^7$ .................................... H03M 11/00
(52) U.S. Cl. .......................... 341/22; 455/418; 455/419
(58) Field of Search .................... 341/22, 23, 26; 455/419, 418; 379/102.01

(56) References Cited

U.S. PATENT DOCUMENTS

| | | | |
|---|---|---|---|
| 5,297,191 | 3/1994 | Gerszberg | 379/59 |
| 5,749,052 | * 5/1998 | Hidem et al. | 455/406 |
| 5,819,175 | * 10/1998 | Niemi | 455/418 |
| 5,926,756 | * 7/1999 | Piosenka et al. | 455/419 |

FOREIGN PATENT DOCUMENTS

| | | |
|---|---|---|
| 3620925 | 1/1988 | (DE) . |
| 4333272 | 4/1995 | (DE) . |
| 0478231 | 4/1992 | (EP) . |
| 0590334 | 4/1994 | (EP) . |
| 0 590 334 B1 | 4/1994 | (EP) . |
| 2249923 | 7/1991 | (GB) . |
| 2256113 | 5/1992 | (GB) . |

OTHER PUBLICATIONS

Schwartz, B.K. & Weinstein, S.B. of Bell Communications Research, Red Bank NJ, "Dual–media messaging using screen telephones on the telephone network," in ICC '93 Geneva, Technical Program, Conference Record, IEEE International Conference on Communications, vol. 2, pp. 1183–1186 (May 23–26, 1993).

* cited by examiner

*Primary Examiner*—Michael Horabik
*Assistant Examiner*—Timothy Edwards, Jr.
(74) *Attorney, Agent, or Firm*—Milton Oliver; Ware, Fressola, Van Der Sluys & Adolphson LLP

(57) ABSTRACT

The invention relates to a method of setting and performing freely programmable functions of a telecommunications terminal (U) with function control keys (KB) and a control unit (Ctrl) for initiating functions which are selected by actuating the function control keys, and with an access unit (UIC) providing access to the telecommunications network (N), wherein for the purpose of setting or performing a function, a connection is established between the control unit and a service unit (S1, S2) via the access unit, and wherein the setting or performance of the function takes place from this service unit, and to a telecommunications terminal.

3 Claims, 2 Drawing Sheets

METHOD OF REMOTELY PROGRAMMING A CELLPHONE VIA A NETWORK

BACKGROUND OF THE INVENTION

1. Technical Field

This invention relates to a method of setting and performing freely programmable functions of a telecommunications terminal, and to a telecommunications terminal with function control keys and a control unit for initiating freely programmable functions.

2. Discussion of Related Art

Since the invention of the telephone, telecommunications terminals have undergone an astonishing development. From simple telephones with the functions "lifting the handset—talking and listening—hanging up", through direct dialing, first only with a rotary dial using dial pulse signaling and later with keys using multifrequency signaling and, based thereon, abbreviated dialing with function keys, to PCs, which also serve as telecommunications terminals and also provide communications capabilities other than only voice communication, the applications of telecommunications terminals have multiplied. As a result, however, both the possibilities of and the requirements for control actions, such as the programming of short codes, have greatly increased. Operating aids are manifold, too. For example, by actuating a single function key, a whole process can be initiated, or displays are used which serve to detect input errors. It is also known, for example, to assign a particular function to a function key in a menu mode with the aid of a display. Such a menu mode may also be voice-controlled.

SUMMARY OF INVENTION

For both older people and, for example, people with impaired vision, the individualization of function keys is frequently still too troublesome. To this must be added that, as a rule, only those functions can be specified, such as wake-up call at predetermined times, call forwarding or abbreviated dialing to predeterminable destinations, which were intended for the respective set from the beginning.

According to a first aspect of the invention, a method of setting and performing freely programmable functions of a telecommunications terminal with function control keys and a control unit for initiating functions which were selected by actuating predetermined function control keys initiating the respective functions, and with an access unit providing access to a telecommunications network is characterized in that for the purpose of setting or performing a function, a connection is established between the control unit and a service unit in the telecommunications network via the access unit, and that the setting or performance of the function takes place from said service unit.

According to a second aspect of the invention, a telecommunications terminal with function control keys and a control unit for initiating freely programmable functions which were selected by actuating predetermined function control keys initiating the respective functions, and with an access unit providing access to a telecommunications network is characterized in that the control unit and the access unit are interconnected in such a way that a data exchange is possible between the control unit and the telecommunications network.

The invention is based on the idea to permit intervention in the control unit associated with the function keys from the telecommunications network. This makes it possible to either influence the programming of the functions keys from the network or control a service unit in the network directly from a function key, which service unit then performs the desired function. The individual programming of this service unit need not be carried out by the user, either.

Further advantageous features of the invention are defined in the subclaims and will become apparent from the following description.

BRIEF DESCRIPTION OF THE DRAWING

The invention will now be explained in more detail with reference to the accompanying drawings, in which.

DETAILED DESCRIPTION OF PREFERRED EMBODIMENTS

Figure 1:
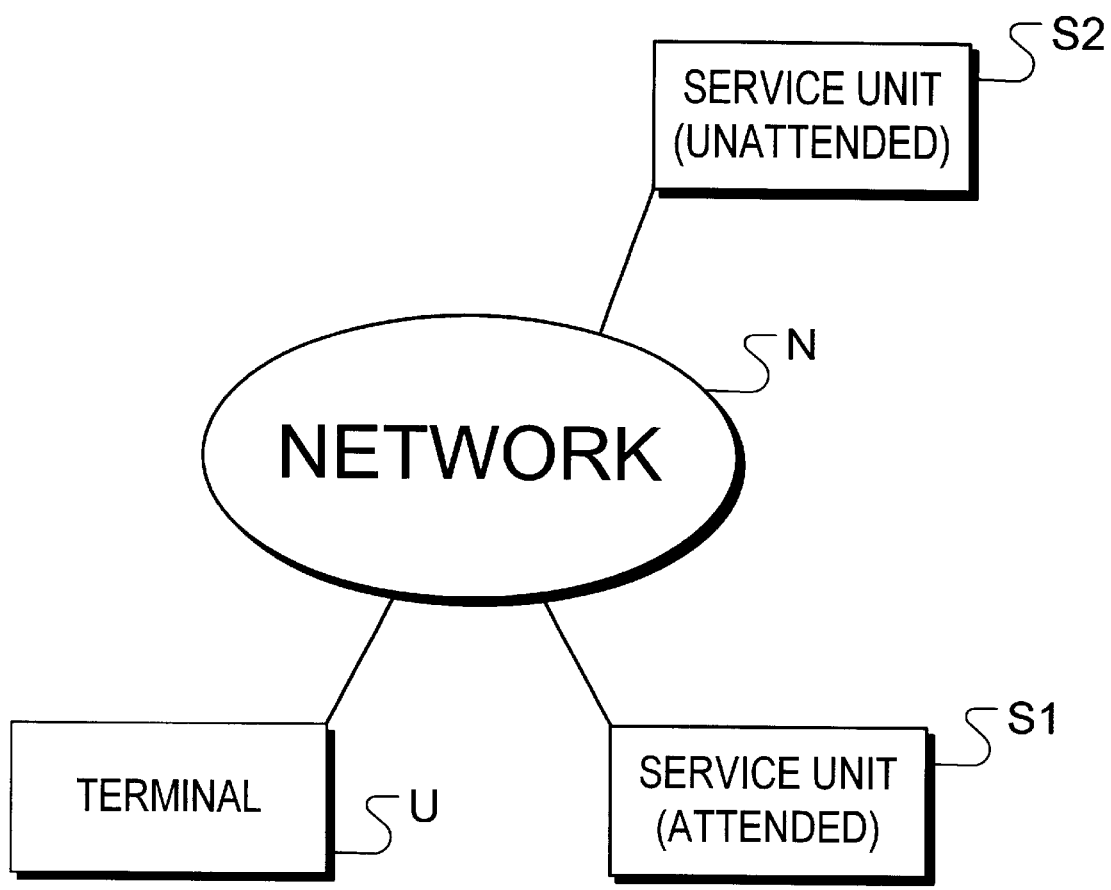
FIG. 1 shows a telecommunications network with components essential for the implementation of the invention.

Referring to FIG. 1, with the aid of which the method according to the invention will be described, there is shown a telecommunications network N, a telecommunications terminal U according to the invention connected thereto, and two service units S1 and S2. The service unit S1 is an attended unit, while the service unit S2 is an unattended unit.

If the user of the telecommunications terminal U wants a new function at the terminal which he cannot set himself for any reason whatsoever, he will establish a connection to the service unit S1 and specify his wish to the operator there, for example, that he wants to have a function key as a name key for dialing the number of a particular subscriber.

A first possibility of implementing this wish is for the operator at the service unit S1 to reprogram the control unit of the telecommunications terminal U via the network in such a way that, when a particular function key or a particular combination of keys is actuated, the control unit of the telecommunications terminal U will perform this function. If combinations of keys are used, the first key to be actuated must be a function key; the following ones may also be the numerical keys for dialing. A prerequisite for this possibility is that the control unit can be programmed from the network.

A second possibility of implementing this wish requires that the telecommunications terminal U be so designed, or its control unit be so programmable from the network, that the actuation of at least particular function keys or combinations of keys can be signaled directly to a predetermined point in the network. In this embodiment, such a point is the service unit S2. The wish is then realized by the operator at the service unit S1 performing the necessary programming via the network. This may include programming the control unit of the telecommunications terminals U in such a way that the pressing of the keys of the telecommunications terminal U which are assigned for this function is signaled from this terminal to the service unit S2. In any case, the service unit S2 must be programmed from the service unit S1 in such a way that the desired function will be performed for the telecommunications terminal U if the key depression intended for this function is signaled from there.

It is readily apparent that the two aforementioned possibilities are applicable separately or in combination. Therefore, the telecommunications terminal U need not necessarily have the capability both to be programmed from the network and to signal key actuations to the network. The service unit S2 need not necessarily be present, either.

From the service unit S2, switching operations in the network are initiated. The service unit S2 must therefore meet the relevant specifications of at least that network operator to which the telecommunications terminal U is connected. Preferably, the service of the service unit S2 is offered by this network operator as an IN service (IN= intelligent network). The equipment necessary for this purpose is generally known and frequently present anyhow. Creating new services may be expensive in an individual case but presents no problem in principle. The service unit S1 may also be combined with the service unit S2.

If the function be performed after actuation of a function key is initiated not from the telecommunications terminal U but from the service unit S2, functions can be performed which otherwise would not be possible or which are introduced later. For example, a speed calling function "doctor" can be performed by actuating a function key such that the family doctor is connected to the telecommunications terminal U during his office hours, a locum tenens is connected during the doctor's vacation, and a medical emergency service is connected at night. The service unit S2 must, of course, have the necessary information. Connections to other network operators, for example into a mobile-radio network, and connections directly from the telecommunications terminal U are also possible.

In conclusion a telecommunications terminal U according to the invention will be described with reference to FIG. 2.

Figure 2:
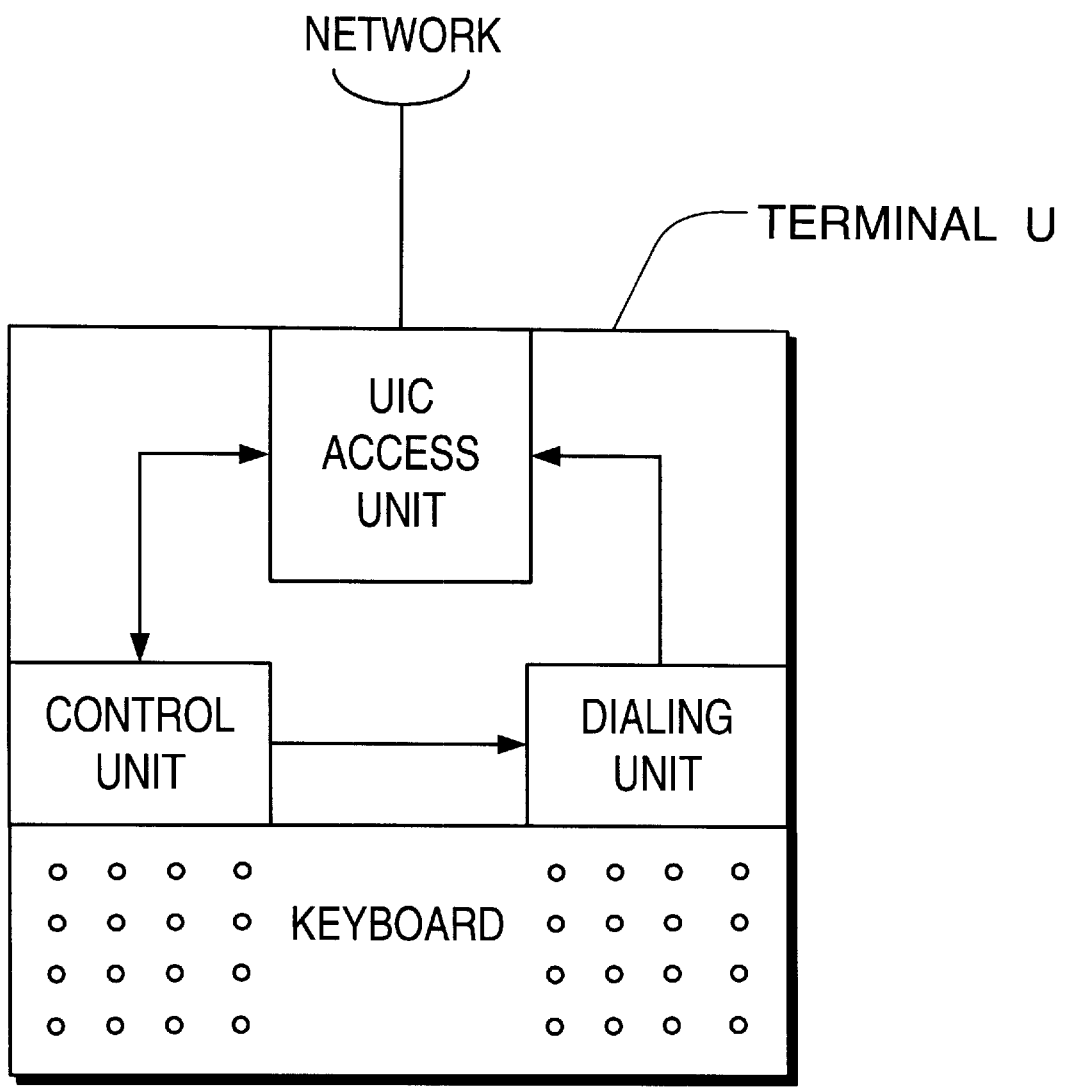
FIG. 2 shows a telecommunications terminal according to the invention.

FIG. 2 shows schematically the telecommunications terminal U with its connection to the network N and with a keypad KB. The telecommunications terminal U has an access unit UIC, a control unit Ctrl, and a dialing unit DU. The keypad is indicated by a matrix array of four by four keys as function keys and a matrix array of three by four keys as numerical keys for dialing.

The user-data path is not shown in this representation. The graphical division into these different units is uncommon but appears to be the best way of illustrating the peculiarity of the present invention. The actuation of function keys commonly triggers a control mechanism which either acts only in the terminal itself or results in a dialing process which outwardly proceeds like a dialing process performed manually by successive actuation of corresponding numerical keys. This corresponds to the path from the control unit Ctrl via the dialing unit DU and the access unit UIC into the network. According to the invention, either the operation of the control unit can be influenced directly from the network or the actuation of function keys can be signaled directly to the network (or both). This is indicated by the bilateral direct connection between the control unit Ctrl and the access unit UIC.

The access unit UIC fulfills the transmission functions. If the telecommunications terminal is connected to the ISDN (Integrated Services Digital Network), the interface circuit for the interface U will be used for the access unit (UIC=U Integrated Circuit).

What is claimed is:

1. A method of setting and performing freely programmable functions of a telecommunications terminal (U) with function control keys (KB) and a control unit for initiating functions which were selected by actuating predetermined function control keys (KB) initiating the respective functions, and with an access unit (UIC) providing access to a telecommunications network, comprising the steps of setting or performing freely programmable functions of a telecommunication terminal (U) by, establishing a connection via said access unit (UIC) through said telecommunications network (N) between the control unit and a remotely-located service unit attended by a human operator (S1, S2) and exchanging voice communications between a user of the telecommunications terminal and said human operator, thereby permitting said human operator to remotely set or perform said functions in said telecommunications terminal (U) by sending signals from said remotely-located service unit to said telecommunication terminal (U).

2. A method as claimed in claim 1, characterized in that the setting of at least part of the functions is accomplished by programming the control unit (Ctrl) from the service unit (S1) in such a way that actuating a particular function control key or a combination of keys causes a particular function to be performed.

3. A method as claimed in claim 1, characterized in that to perform at least part of the functions, upon actuation of a particular function control key or a combination of keys, a connection is established to the service unit (S2) and the performance of a particular function is controlled from said service unit (S2).

* * * * *